(12) United States Patent
Gallagher et al.

(10) Patent No.: US 9,815,217 B2
(45) Date of Patent: Nov. 14, 2017

(54) SYSTEM AND METHOD FOR FORMING HOLES ONTO A SHEET-METAL ASSEMBLY

(71) Applicant: FORD MOTOR COMPANY, Dearborn, MI (US)

(72) Inventors: Steve William Gallagher, Bloomfield Hills, MI (US); Jon A. Wilcox, Dearborn, MI (US); Vladimir Vladimirovich Bogachuk, West Bloomfield, MI (US); Richard Daniel Pastrick, Roseville, MI (US); Timothy D. Parker, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 367 days.

(21) Appl. No.: 14/568,617

(22) Filed: Dec. 12, 2014

(65) Prior Publication Data

US 2016/0167247 A1 Jun. 16, 2016

(51) Int. Cl.
| | | |
|---|---|---|
| G06F 19/00 | (2011.01) |
| B26D 5/00 | (2006.01) |
| G05B 19/18 | (2006.01) |
| B26F 1/00 | (2006.01) |
| B21D 28/24 | (2006.01) |
| B21D 53/88 | (2006.01) |

(52) U.S. Cl.
CPC ............. B26D 5/007 (2013.01); B21D 28/24 (2013.01); B26F 1/00 (2013.01); G05B 19/182 (2013.01); B21D 53/88 (2013.01); *G05B 2219/35005* (2013.01); *G05B 2219/35087* (2013.01)

(58) Field of Classification Search
CPC ........... B26D 5/007; B21D 28/24; B26F 1/00; G05B 19/182

USPC .......................................................... 700/145
See application file for complete search history.

(56) References Cited

U.S. PATENT DOCUMENTS

| | | | |
|---|---|---|---|
| 4,912,644 A * | 3/1990 | Aoyama | G06T 17/10 345/419 |
| 5,655,426 A | 8/1997 | DeJohn | |
| 8,285,413 B1 * | 10/2012 | Shoulders | B25J 9/0084 29/430 |
| 2003/0208293 A1 * | 11/2003 | Mountcastle, III | G05B 19/41865 700/96 |
| 2006/0079989 A1 * | 4/2006 | Ishii | G06F 17/50 700/182 |
| 2009/0084766 A1 | 4/2009 | Moritz et al. | |
| 2012/0283861 A1 * | 11/2012 | Zwickl | G05B 19/404 700/97 |

FOREIGN PATENT DOCUMENTS

WO       0054925       9/2000

* cited by examiner

*Primary Examiner* — Robert Cassity
(74) *Attorney, Agent, or Firm* — Damian Porcari; Brooks Kushman P.C.

(57) ABSTRACT

Various approaches for forming holes onto a sheet-metal assembly are described. In one implementation, a sheet-metal assembly is received through a conveyor system within a manufacturing cell. Once received, the type of sheet-metal assembly is identified based on associated information. Corresponding to the identified sheet-metal assembly, a set of position coordinates corresponding to one or more points on the sheet-metal assembly are obtained. Subsequently, a work-performing apparatus may be used for forming holes onto the sheet-metal assembly, at one or more points on the sheet-metal assembly.

17 Claims, 4 Drawing Sheets

SYSTEM AND METHOD FOR FORMING HOLES ONTO A SHEET-METAL ASSEMBLY

BACKGROUND

Automobiles have become an essential requirement in daily lives, and this has resulted in an increase in their demand. The manufacturing of the automobiles is undertaken in an assembly process. Prior to providing the various components of the automobile, such as the engine, various body components may be processed. As part of the processing, various portions of the automotive body may undergo a series of positioning and welding steps before a structurally rigid body frame, referred to as a body-in-white, is produced. The body-in-white structure, also referred to as a sheet-metal assembly, may be further processed before vehicle components can be fitted onto the sheet-metal assembly. For example, a plurality of holes may be pierced through the sheet-metal assembly.

BRIEF DESCRIPTION OF THE DRAWINGS

For a more complete understanding of one or more implementations of the present invention, reference is now made to the one or more implementations illustrated in greater detail in the accompanying drawings and described below wherein.

SUMMARY

Figure 1:
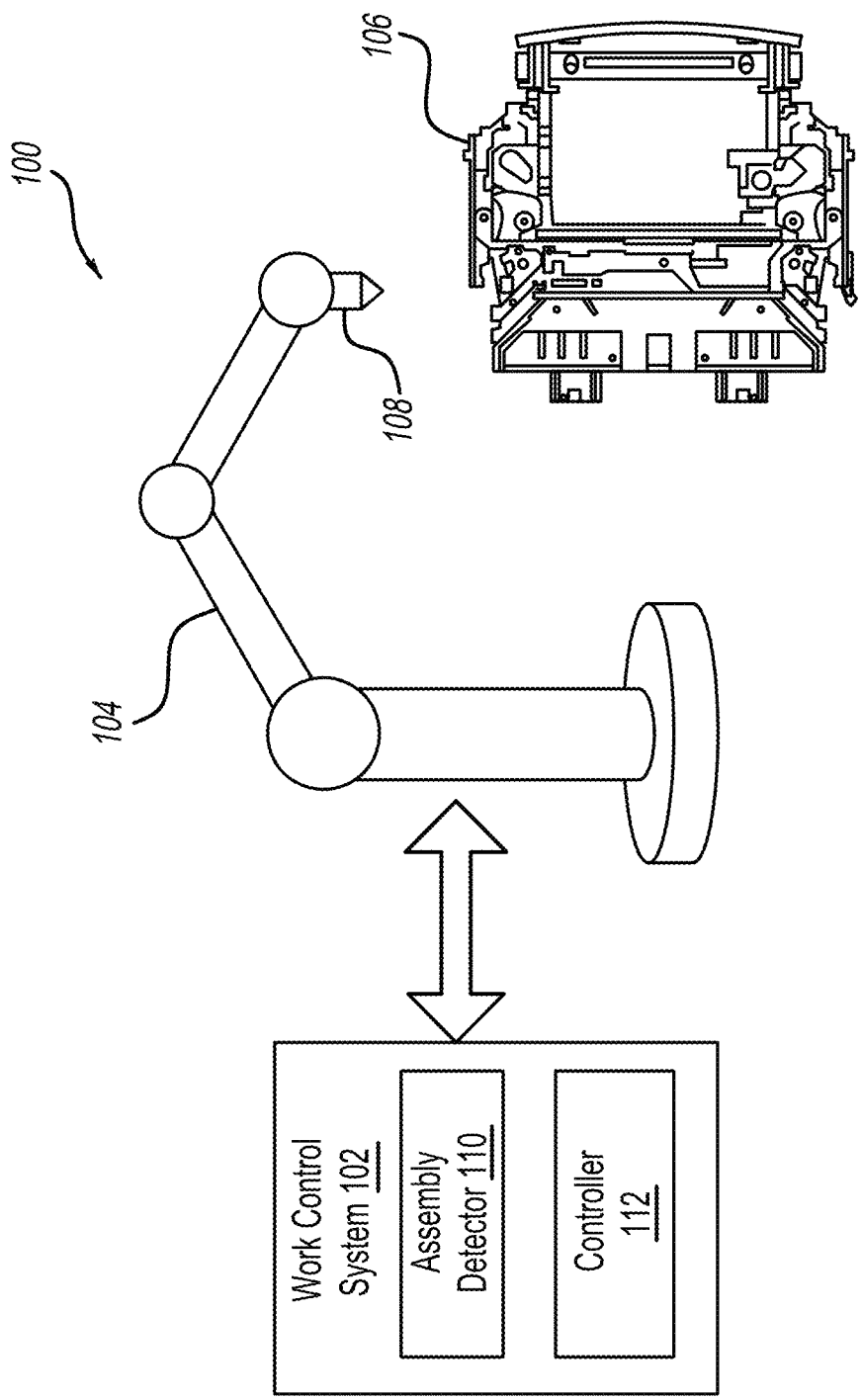
FIG. 1 is a diagram of an environment for implementing a hole forming process onto a sheet-metal assembly, as per an example of the present subject matter.

This summary is provided to introduce concepts related to systems and methods for cutting holes onto a sheet-metal assembly. The concepts are further described below in the detailed description. This summary is not intended to identify essential features of the claimed subject matter nor is it intended for use in determining or limiting the scope of the claimed subject matter.

In one implementation, a sheet-metal assembly is received through a conveyor system within a manufacturing cell. Once received, the type of sheet-metal assembly is identified based on associated information. Corresponding to the identified sheet-metal assembly, a set of position coordinates corresponding to one or more points on the sheet-metal assembly are obtained. Subsequently, a work-performing apparatus may be used for cutting holes, at one or more points on the sheet-metal assembly.

One or more advantageous features as described herein will be readily apparent from the following detailed description of one or more embodiments when taken in connection with the accompanying drawings.

DETAILED DESCRIPTION

Manufacturing of vehicles, such as automobiles, is accomplished in different stages. Each of the different stages may in involve attaching a plurality of components to the automotive body. The automotive body in turn is produced by attaching a plurality of sheet metal components. The sheet metal components may be attached together using welding, to result in a sheet-metal assembly. The sheet-metal assembly may be considered as a structural support for other components of the vehicle.

Generally, different components may be further attached to the portion of the automotive body. The attachment may be affected through the holes, which may be used for fixedly attaching the components to the portions of the automotive body. For example, within the front structure, a plurality of holes may be provided onto the strut mounting structure e.g. strut tower, strut turret, shock tower, shock turret, to attach strut mechanisms to the automotive body. In a similar manner, different dimensioned holes may be provided onto the sheet-metal assembly for attaching other components to the automotive body. It should be noted that the positioning of such holes is to be accurate. An error in the positioning or dimensions of the holes may result in misalignment of the attached components. This may affect the operability and functioning of the vehicle.

In order to further attach the different components to the sheet-metal assembly, the sheet-metal assembly may be further processed through a hole forming process. The forming process may involve piercing holes within the sheet-metal assembly for attaching the various components. The forming processes, such as piercing, may be carried be carried out after the sheet-metal assembly is obtained. Carrying out the hole forming processes onto the sheet-metal assembly, as opposed to the sheet metal components, allows achieving the shortest possible tolerance paths along the different portions of the sheet-metal assembly. The shortest possible tolerance paths are to ensure that the alignment target and specifications are conformed with.

Processes for manufacturing the automotive body may be generally automated so as to reduce the extent of manual labor involved. The automated work-processes may be carried out by computing-based work-performing system. Furthermore, such automation may generally also result in an increase in speed at which the work-processes (e.g., piercing of holes) are carried out, and at the same time also ensuring high accuracy of the work being performed. Generally, automation of such processes may be carried out by programming work-performing systems which, as a result of the programmed instructions, carry out the work-process. For example, hydraulically actuated piercing-cutting machines may be suitably programmed for cutting or piercing of holes in the sheet-metal assembly.

The systems as described above may however be used for specific types of sheet-metal assembly. For example, within a manufacturing cell, a work-performing system may be configured for piercing holes through sheet-metal assemblies used typically for automotive bodies of a narrow bodied vehicle. In such a case, the same manufacturing cell may not be used for piercing holes in automotive bodies for a wide-bodied vehicle. If at all, automotive bodies for wide-bodied vehicle are to be processed, the operations of the manufacturing cell may have to be stopped and readjustments may have to be made to the machinery and the equipment. Furthermore, in case a new set-up is required for processing sheet-metal assemblies for wide-bodied vehicles, the same physical space may not be available for other type of sheet-metal assemblies. This inadvertently results in limitations and inefficiencies to the overall manufacturing process.

Examples of such types of systems are described in US Patent Pub. 2009/0084766 ('766 application). The '766 application describes a laser cutting system comprising an electronically controllable robot for controlling movement of a laser cutting head to move the cutting head to one or more prescribed positions with respect to a work-piece. The coordinates of the prescribed position on the work-piece are programmed into the cutting system. The '766 application further provides a mechanism for distance correction for accurate operations by the laser cutting system. Although, the '766 application describes an automated system for performing work on a specific type of work-piece, the described implementations in the '766 application does not describe carrying out similar works on different types of work-piece. In such a case, if a different work-piece is to be worked upon, then the entire system may have to be reconfigured with the position coordinates of the different workpiece. This would eventually result in downtime, and hence would affect the efficiency of the manufacturing process.

As explained briefly, the cutting processes may be automated and may be carried out using one or more computing-based control systems. Such control systems may be connected with a cutting apparatus. The control systems may be suitably programmed with instruction based on which the cutting apparatus may be controlled and the piercing or cutting of holes within the sheet-metal assembly may be carried out. The instructions enable the cutting apparatus to accurately provide holes onto the sheet-metal assembly. In such a manner, the entire cutting process may be automated.

In operation, the control systems may rely on one or more control points which may be provided onto the body of the sheet-metal assembly. The control points serve as identifiers for the control system to determine the exact locations on the sheet-metal assembly at which the holes are to be provided. For example, on determining the position of the control point on the sheet-metal assembly, the control system may determine a spatial relative distance on the body of the sheet-metal assembly at which the hole is to be provided. In such a manner, one or more holes may be provided onto the sheet-metal assembly.

Such systems, as also explained previously, may only operate on specific types of sheet-metal assembly. For example, if a manufacturing cell is configured for forming holes on sheet-metal assemblies of only narrow bodied vehicle, then such system may not be flexible to also perform similar processes on the sheet-metal assembly of wide-bodied vehicles. In cases where such a need arises, the manufacturing cell may have to be reconfigured such that sheet-metal assembly of wide-bodies vehicles may be processed in place of the sheet-metal assembly of the narrow bodied vehicle. Such reconfiguration would involve setting up additional assembly cells or lines for forming of other types of sheet-metal assemblies. These would be subject to both financial as well as space constraints.

To this end, approaches for implementing a process for forming holes a sheet-metal assembly are described. In one implementation, a sheet-metal assembly, through a conveyor system within a manufacturing cell, is received. The manufacturing cell in turn may include a work-performing apparatus coupled to a computing-based control system. The control system may generate instructions for controlling the operations and movement of the work-performing apparatus. The work-performing apparatus is eventually utilized for forming holes on the sheet-metal assembly.

As mentioned previously, the sheet-metal assembly is received via a conveyor system for processing. Once received, the type of the sheet-metal assembly is identified. In one implementation, the identification of the sheet-metal assembly may involve determining whether the sheet-metal assembly under consideration is for a narrow bodied or for a wide bodied vehicle. Once the type of the sheet-metal assembly is identified, a set of position coordinates corresponding to the identified sheet-metal assembly, are subsequently obtained. The position coordinates relate to one or more points on the surface of the sheet-metal assembly. As would be evident from the following description, the position coordinates serve as the basis for identifying locations on the surface of the sheet-metal assembly at which the desired work is to be performed.

Once the position coordinates are determined one or more executable instructions, for controlling the operation of the work-performing apparatus, are generated. In one implementation, the instructions may be generated by a control system based on the position coordinates. Upon execution of the instructions, the movement of the work-performing apparatus may be controlled. For example, the work-performing apparatus may be positioned with respect to the sheet-metal assembly. The work-performing apparatus may be positioned at locations which correspond to the position coordinates. Once positioned, the work-performing apparatus may be activated to cut holes at one or more locations on the sheet-metal assembly.

The above described process may be repeated for similar types of sheet-metal assembly. However, in cases where the sheet-metal assembly is different, the type of the sheet-metal assembly under consideration may be identified and determined. Corresponding to the different type of the sheet-metal assembly, a different set of position coordinates may be determined. Subsequently, the work-performing apparatus may be positioned and activated in accordance with the different set of position coordinates, and accordingly the holes may be provided at the corresponding locations on the sheet-metal assembly.

The disclosed subject matter is believed to have overcome one or more of the problems associated with systems generally known in the art. For example, the present approach allows for utilizing the same manufacturing cell for carrying out the hole forming process onto different types of sheet-metal assemblies, without incurring the need for additional infrastructure or without making any changes to the existing infrastructure within the manufacturing cell. As described, different types of sheet-metal assemblies may be identified on the conveyor line, and their corresponding position coordinated can be determined. Based on the position coordinates, the work-performing apparatus can be controlled and the hole forming process can be carried out.

The manner in which the different types of sheet-metal assemblies are identified may differ in approaches, without deviating from the scope of the present subject matter. For example, an image of the sheet-metal assembly under consideration may be initially captured, and processed. A variety of image processing techniques may be utilized to identify and determine the type of the sheet-metal assembly. In another example, the different sheet-metal assemblies may each be associated with unique identifier tags. Examples of such tags include, but are not limited to, bar codes and radio-frequency identification (RFID) tags. In such a case, the work-performing apparatus may be provided with a sensor which may scan the tagged identifier. In yet another example, the type of the sheet-metal assembly may be determined based on a detection hole. In such examples, The detection hole may be provided on any component of the sheet-metal assembly. The type of the sheet-metal assembly may be dependent on a variety of hole-related parameters such number of holes, and hole diameter. On scanning, one or more attribute data may be subsequently obtained, based on which the type of the sheet-metal assembly may be determined. The attribute data may define the specific characteristics of the sheet-metal assembly 106. Examples of attribute data include, but not limited to, shape, dimensions, profile and weight.

The above approaches may be implemented using one or more processor-based or other logic devices. Such devices may be implemented as stand-alone devices or as a combination of multiple computing devices. Such computing devices may be subsequently interfaced with the work-performing apparatus for carrying out the hole forming process for a sheet-metal assembly. It should also be noted that the hole forming process may be carried out by cutting or piercing the sheet-metal assembly to form the holes.

The above mentioned implementations are further described herein with reference to the accompanying figures. It should be noted that the description and figures relate to exemplary implementations, and should not be construed as a limitation to the present subject matter. Various other arrangements and implementations may be devised that, although not explicitly described or shown herein, embody the principles of the present subject matter. Moreover, all statements herein reciting principles, aspects, and embodiments of the present subject matter, as well as specific examples, are intended to encompass equivalents thereof.

As referenced in the figures, the same reference numerals are used to refer to the same components. In the following description, various operating parameters and components are described for different constructed implementations. These specific parameters and components are included as examples and are not meant to be limiting. The drawings referenced herein are schematic and associated views thereof are not necessarily drawn to scale FIG. 1 provides a block diagram depicting a vehicle manufacturing assembly 100 for carrying out a hole forming process for a sheet-metal assembly. The vehicle manufacturing assembly 100 may be implemented within a manufacturing cell of an automotive manufacturing facility. For carrying out the hole forming process for a sheet-metal assembly, the vehicle manufacturing assembly 100 further includes a work control system 102. The work control system 102 is further connected to a work-performing apparatus 104. The work control system 102 generates instructions for controlling the work-performing apparatus 104 to carry out the hole forming processes onto a sheet-metal assembly 106.

The work-performing apparatus 104 can be any apparatus which exerts different types of forces onto the sheet-metal assembly 106 for carrying out any one or more forming processes. The work-performing apparatus 104 may be a cutting apparatus, such as a laser cutting apparatus or a hydraulically actuated-cutting apparatus. The work-performing apparatus 104 may be used for carrying out different types of processes onto the sheet-metal assembly 106. For example, the work-performing apparatus 104 may be used for forming holes within a sheet-metal assembly 106, either by piercing or cutting.

The vehicle manufacturing assembly 100 as described is capable of identifying different types of sheet-metal assembly 106, and accordingly provides the holes onto the sheet-metal assembly 106 based on the type of the identified sheet-metal assembly 106. The work-performing apparatus 104 may be further provided with one or more sensor(s) 108. The sensor(s) 108 may be configured to detect and identify the type of the sheet-metal assembly 106 being conveyed through the vehicle manufacturing assembly 100.

The work control system 102 further may include assembly detector 110 and a controller 112. The assembly detector 110 may determine the type of the sheet-metal assembly 106, and the controller 112 may further generate one or more instructions for controlling the movement and operation of the work-performing apparatus 104.

In operation, a certain type of sheet-metal assembly 106 may be conveyed through the vehicle manufacturing assembly 100. The sheet-metal assembly 106 may be conveyed through a conveyor mechanism (not shown in FIG. 1) to bring the sheet-metal assembly 106 in close proximity to the work-performing apparatus 104. The sheet-metal assembly 106 may be further placed over a carrier assembly (also not shown in FIG. 1), over which it is conveyed through the vehicle manufacturing assembly 100.

Once the sheet-metal assembly 106 is positioned in proximity to the work-performing apparatus 104, the type of the sheet-metal assembly 106 is determined. For example, the sensor(s) 108 provided on the work-performing apparatus 104 may detect data representing one or more physical attributes (such as geometry, size, etc.) of the sheet-metal assembly 106. The sensor(s) 108 may also be configured to detect one or more tagged identifiers associated with the sheet-metal assembly 106. The sensor(s) 108 may, based on the physical attribute data or the tagged identifiers, capture certain information associated with the sheet-metal assembly 106. Once the information associated with the sheet-metal assembly 106 is obtained, the same are communicated to the work control system 102.

The work control system 102 receives the information associated with the sheet-metal assembly 106. The received information may then be analyzed by the assembly detector 110. For example, the assembly detector 110 may compare the information gathered from the sensor(s) 108 with pre-defined assembly related information stored within the work control system 102. Based on the comparison, the assembly detector 110 may determine the type of the sheet-metal assembly 106, which is to be processed.

Once the type of the sheet-metal assembly 106 is identified, the controller 112 may determine one or more position coordinates based on the identified sheet-metal assembly 106. Based on the position coordinates, the controller 112 may control the movement and operation of the work-performing apparatus 104. For example, the controller 112 may generate executable instructions, which when executed, control the movement and operation of the work-performing apparatus 104. The work-performing apparatus 104 may subsequently be operated, by virtue of the execution of the instructions, to form holes, but cutting or piercing, at locations corresponding to the determined position coordinates.

The disclosed subject matter is believed to have overcome one or more of the problems associated with providing holes onto sheet-metal assemblies, such as sheet-metal assembly 106. In the implementations as described herein, different types of sheet-metal assemblies 106 may be processed within the vehicle manufacturing assembly 100. For example, the work control system 102 may identify the types of the different sheet-metal assemblies 106 and accordingly obtain the respective position coordinates for the respective sheet-metal assemblies 106. Accordingly, the controller 112 may operate the work-performing apparatus 104 to form holes at locations corresponding to the position coordinates. As and when different types of sheet-metal assemblies 106 are conveyed, the work control system 102 would identify the type of the sheet-metal assemblies 106, and accordingly control the movement and operation of the work-performing apparatus 104 to pierce the holes in accordance with the type of the sheet-metal assemblies 106. Although the present description is provided in conjunction with piercing holes onto the sheet-metal assemblies 106, any other types of forming processes performed over any other types of workpiece would also be covered within the scope of the present subject matter.

Figure 2:
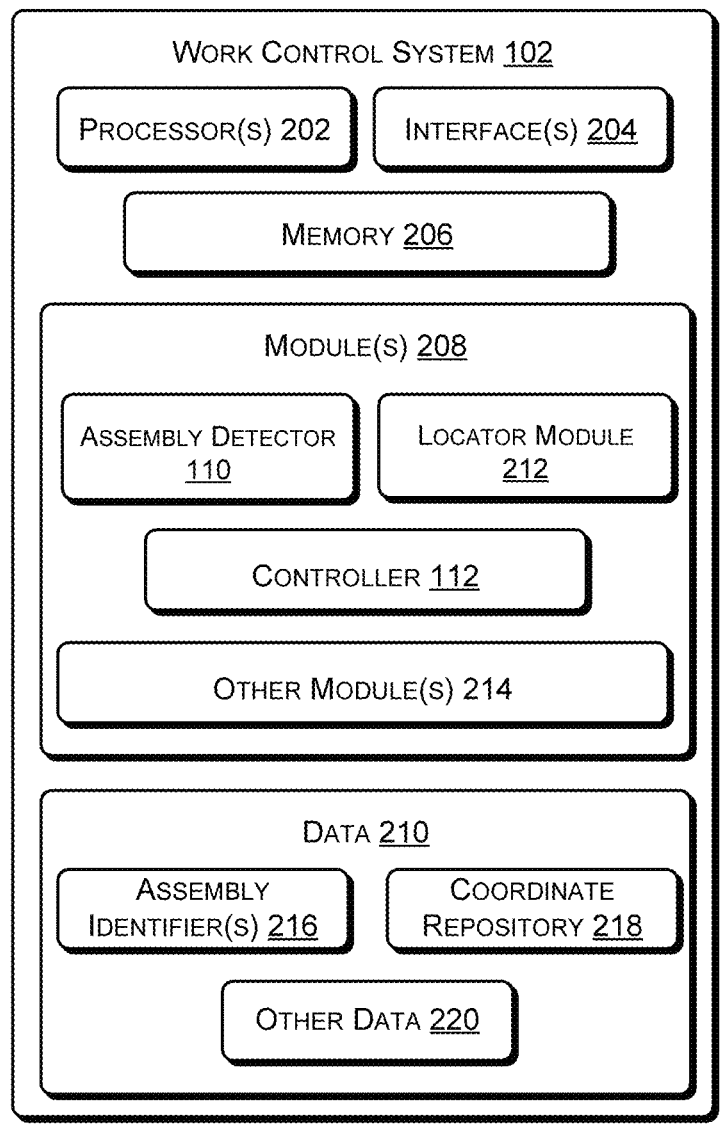
FIG. 2 is a block diagram of a work controlling system, as per an implementation of the present subject matter.

FIG. 2 depicts an exemplary work control system 102 implemented as a computing-device, for carrying out a hole forming process for a sheet-metal assembly. The work control system 102 may be implemented as a stand-alone computing device. Examples of such computing devices include laptops, desktops, tablets, or any other forms of computing devices. Continuing with the present implementation, the work control system 102 may further include a processor(s) 202, interface(s) 204 and memory 206. The processor(s) 202 may also be implemented as signal processor(s), state machine(s), logic circuitries, and/or any other device or component that manipulate signals based on operational instructions.

The interface(s) 204 may include a variety of interfaces, for example, interfaces for data input and output devices, referred to as I/O devices, storage devices, network devices, and the like, for communicatively associating the work control system 102 with work-performing apparatus 104 (not shown in FIG. 2). The interface(s) 204 may also be used for facilitating communication between the work control system 102 and various other computing devices connected in a network environment. The memory 206 may store one or more computer-readable instructions, which may be fetched and executed for carrying out a forming process for a sheet-metal assembly. The memory 206 may include any non-transitory computer-readable medium including, for example, volatile memory, such as RAM, or non-volatile memory such as EPROM, flash memory, and the like.

The work control system 102 may further include module(s) 208 and data 210. The module(s) 208 may be implemented as a combination of hardware and programming (e.g., programmable instructions) to implement one or more functionalities of the module(s) 208. In one example, the module(s) 208 includes assembly detector 110, location module 212, controller 112 and other module(s) 214. The data 210 on the other hand includes assembly identifier 216, coordinate repository 218, and other data 220.

In examples described herein, such combinations of hardware and programming may be implemented in a number of different ways. For example, the programming for the module(s) 208 may be processor executable instructions stored on a non-transitory machine-readable storage medium and the hardware for the module(s) 208 may include a processing resource (e.g., one or more processors), to execute such instructions. In the present examples, the machine-readable storage medium may store instructions that, when executed by the processing resource, implement module(s) 208 or their associated functionalities. In such examples, the work control system 102 may include the machine-readable storage medium storing the instructions and the processing resource to execute the instructions, or the machine-readable storage medium may be separate but accessible to work control system 102 and the processing resource. In other examples, module(s) 208 may be implemented by electronic circuitry.

In operation, the work control system 102 may receive an indication corresponding to a sheet-metal assembly 106 being conveyed for processing. The sheet-metal assembly 106 may be brought in close proximity to the work-performing apparatus 104. As discussed previously, the work-performing apparatus 104 may be further provided by sensor(s) 108. The sensor(s) 108 may detect the sheet-metal assembly 106, and may obtain data representing one or more attributes associated with the sheet-metal assembly 106. The attribute data may be based on the physical structure of the sheet-metal assembly 106. In another implementation, the sensor(s) 108 may capture an image of the sheet-metal assembly 106. Further image analysis may be performed to determine the type of the sheet-metal assembly 106. In another implementation, one or more tagged identifiers may be associated with the sheet-metal assembly 106. For example, the sheet-metal assembly 106 may be carrying a barcode or any other image-based identifier. The sensor(s) 108 may be used for scanning the tagged identifier. Based on the tagged identifier, the sheet-metal assembly 106 may be identified.

In one implementation, the assembly detector 110 may receive information associated with the sheet-metal assembly 106. Based on the information captured by the sensor(s) 108, the assembly detector 110 may determine one or more unique identifiers indicating the type of the sheet-metal assembly 106. In the present implementation, the unique identifier may be stored as assembly identifier 216. The assembly identifier 216 may uniquely identify the type of the sheet-metal assembly 106. For example, the assembly identifier 216 may indicate whether the sheet-metal assembly 106 corresponds to a wide-bodied or a narrow-bodied vehicle.

Once the sheet-metal assembly 106 is identified, the location module 212 may further obtain a plurality of position coordinates from the coordinate repository 218 associated with the identified sheet-metal assembly 106. The coordinate repository 218 may store the position coordinates as a mapping between identifiers associated with different sheet-metal assemblies 106, and their respective position coordinates. Based on the mapping, the location module 212 may determine the position coordinates corresponding to the identified sheet-metal assembly 106. The coordinate repository 218 may be implemented as a database which stores and maintains the associations between the type of the sheet-metal assembly 106 and their respective position coordinates. Although the coordinate repository 218 is depicted as being part of the system 102, it may also be implemented externally without deviating from the scope of the present subject matter.

Once the position coordinates are identified, the location module 212 may further determine the appropriate locations on the surface of the sheet-metal assembly 106 corresponding to the position coordinates. In such a case, the location module 212 may determine the appropriate locations relative to a common reference point on the surface of the sheet-metal assembly 106. In one implementation, the sheet-metal assembly 106 may be further provided with master locator holes. The location module 212, based on the position of the master locator holes, may determine the appropriate locations on the sheet-metal assembly 106, at which the holes are to be formed. The appropriate locations may be determined based on a relative spatial distance from the location of the master locator holes. The appropriate locations on the surface of the sheet-metal assembly 106 may be considered as the points at which the holes are to be provided onto the sheet-metal assembly 106.

As explained previously, the sheet-metal assembly 106 may be obtained by assembling portions or multiple components. In some cases, each of the components may have certain tolerances. When each of the components are assembled to provide the sheet-metal assembly 106, the final tolerance measure of the sheet-metal assembly 106 may depend on the cumulative total of the tolerances of each of the components. In some cases, the final tolerance measure may exceed the limits prescribed by the vehicle components specification. In one example, the location module 212 may further obtain a value of the final tolerance measure. Based on the value of the final tolerance measure, the location module 212 may determine appropriate locations based on the position coordinates and the final tolerance measure. For example, the location module 212 may determine an offset value based on the final tolerance measure and accordingly determine the appropriate locations on the surface of the sheet-metal assembly 106.

Once the location on the surface of the sheet-metal assembly 106 is determined, the controller 112 may further generate one or more executable instructions for controlling the movement and operation of the work-performing apparatus 104. Based on the generated instructions, the controller 112 may position the work-performing apparatus 104 with respect to the sheet-metal assembly 106 in accordance with the appropriate locations on the surface of the sheet-metal assembly 106. In one implementation, the work-performing apparatus 104 may be implemented at the end of a robotic arm, which would enable movement of the work-performing apparatus 104 relative to the sheet-metal assembly 106.

In the above implementation, the work-performing apparatus 104 provided on a robotic arm, may allow the work-performing apparatus 104 to be maneuver and align the work-performing apparatus 104 in any direction. In the present implementation, the robotic arm may be configurable so as to possess six degrees of freedom. As a result, this enables the movement of the work-performing apparatus 104 in all coordinate planes.

Once the work-performing apparatus 104 is correctly positioned, the controller 112 may activate the work-performing apparatus 104 to form the hole onto the sheet-metal assembly 106, such as by way of piercing or cutting. In one implementation, the controller 112 may further select and configure the settings of the work-performing apparatus 104 depending on the type of the sheet-metal assemblies 106. For example, the controller 112 may configure the work-performing apparatus 104 to operate at low or medium power settings for processing sheet-metal assemblies 106 which have less thickness. Similarly, the controller 112 may also configure the work-performing apparatus 104 to operate at high-power settings for sheet-metal assemblies 106 having greater thickness. In a similar manner, other configuration settings may be defined considering the type of the sheet-metal assembly 106. In another implementation, the controller 112 may further control the operation to provide holes of different dimensions. The dimensions of the holes to be provided may depend on the type of the sheet-metal assembly 106 being processed. As should be noted, other types of forming processes may also be carried out depending on the type of the sheet-metal assemblies 106.

Once the holes are formed onto the sheet-metal assembly 106, the sheet-metal assembly 106 may be conveyed away, and the next sheet-metal assembly 106 may be processed. Accordingly, the type of sheet-metal assembly 106 may be determined and the holes may be provided therein, in accordance with the determined position coordinates.

As mentioned previously, the work-performing apparatus 104 may be positioned at the end of a robotic arm, which allows for maneuvered movements of the work-performing apparatus 104. In one implementation, a plurality of the work-performing apparatus 104 may also be used for carrying out the forming process for a sheet-metal assembly 106. In such a case, one of the work-performing apparatus 104-1 may be positioned on one side of a conveyor line within the manufacturing cell in the vehicle manufacturing assembly 100. In another implementation, the work-performing apparatus 104 may be positioned above the conveyor line.

Figure 3A:
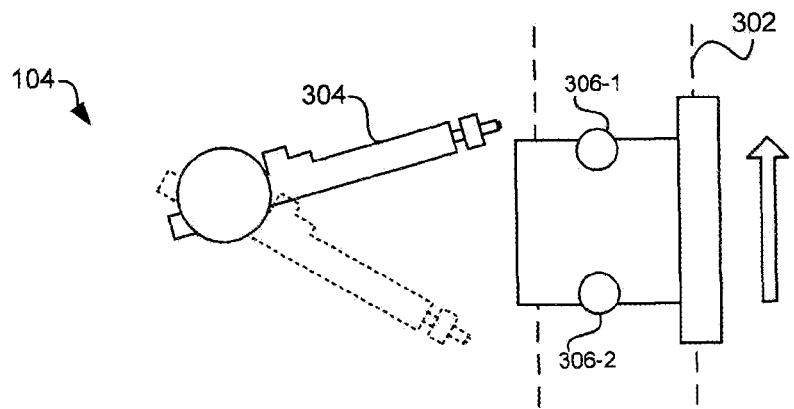
FIGS. 3A-3C are illustration depicting different arrangement of the work-performing apparatus for carrying out a hole forming process onto a sheet-metal assembly, as per an example of the present subject matter.
Figure 3B:
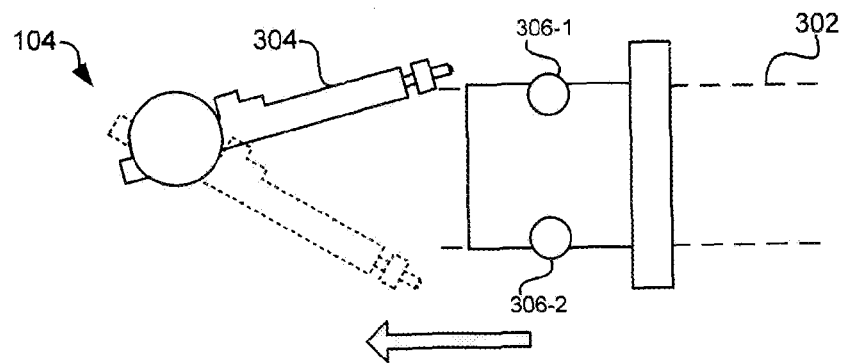
Figure 3C:
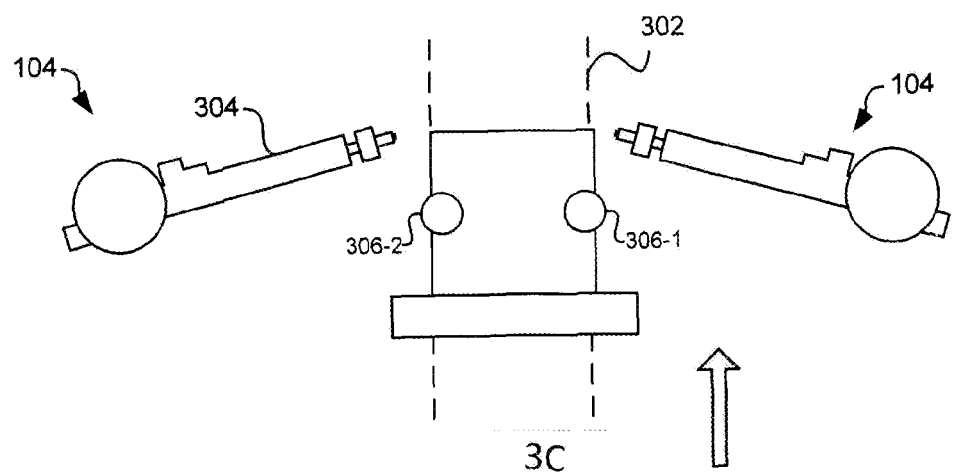

The different combinations in which the work-performing apparatus 104 may be situated with respect to a conveyor line within the vehicle manufacturing assembly 100 is depicted in FIGS. 3A-3C. FIGS. 3A-3C provides implementation which illustrates the different positions in which the work-performing apparatus 104 may be located in proximity to the conveyor line. FIG. 3A depicts work-performing apparatus 104 positioned adjacent to the assembly line path 302. The work-performing apparatus 104 may be affixed to the same supporting floor onto which the assembly line path 302 is implemented. The work-performing apparatus 104 is depicted as possessing an adjustable operating arm 304 (referred to as operating arm 304). The operating arm 304 is for positioning the work-performing apparatus 104 at locations relative to a sheet-metal assembly 106. The sheet-metal assembly 106 is to be processed, e.g., pierced with holes at locations 306-1 and 306-2.

In operation, the sheet-metal assembly 106 is conveyed by the assembly line path 302 in the direction as indicated by direction A. The assembly line path 302 brings the sheet-metal assembly 106 to be processed at a predefined location. When at the predefined location, one or more sensor(s) 108 provided onto the work-performing apparatus 104 may be used for identifying the type of the sheet-metal assembly 106. Once the type of the sheet-metal assembly 106 is identified, the work control system 102 (not shown in FIG. 3) controls the movement to pierce holes at locations 306-1, 306-2. To this end, the work control system 102 may control the movement of the operating arm 304 to bring it to an arm position 308-1, to pierce one or more holes at the location 306-1. Once the holes are pierced, the work control system 102 may move the operating arm 304 of the work-performing apparatus 104 to another arm position 308-2, for piercing holes at the location 306-2. Once the holes are provided at the desired locations, i.e., locations 306-1, 306-2, the sheet-metal assembly 106 is moved away, and another sheet-metal assembly 106 may be brought.

In the illustrative example as depicted in FIG. 3A, the sheet-metal assembly 106 may be oriented in a direction which differs from the direction in which the assembly line path 302 progresses. For example, the sheet-metal assembly 106 having a fore and aft portion, is conveyed in a direction which may be approximately perpendicular to an axis extending along the fore and aft portions of the sheet-metal assembly. The axis of the sheet-metal assembly 106 may be considered as a notional axis dividing the sheet-metal assembly 106 into symmetrical parts. Furthermore, the orientation angle between the axis of the sheet-metal assembly 106 and the direction in which the assembly line path 302 moves may differ without deviating from the scope of the present subject matter.

FIG. 3B depicts the work-performing apparatus 104 mounted over the assembly line path 302. In such a case, the work-performing apparatus 104 may be attached to a structural support which allows for the work-performing apparatus 104 to be fixed and centrally mounted over the conveyor line. For example, the work-performing apparatus 104 may be mounted onto a horizontal beam for structural support. In another implementation, the horizontal beam may also be provided with a plurality of rails for allowing movement of the work-performing apparatus 104 along the length of the horizontal beam. Similar to what has been described in conjunction with FIG. 3A, the movement of the operating arm 304 of the work-performing apparatus 104 may be controlled for providing the holes onto the sheet-metal assembly 106.

FIG. 3C depicts at least two work-performing apparatus 104-1, 2 positioned on either side of the conveyor line. In such a case, the movement of the work-performing apparatus 104-1 may be controlled so as to provide the holes at location 306-1. Similarly, work-performing apparatus 104-2 may be controlled to provide holes at location 306-2. It should be noted that the combinations as described above in conjunction with FIGS. 3A-3C are only illustrated by way of exemplary implementations, and should not be construed as limiting the scope of the present subject matter.

Figure 4:
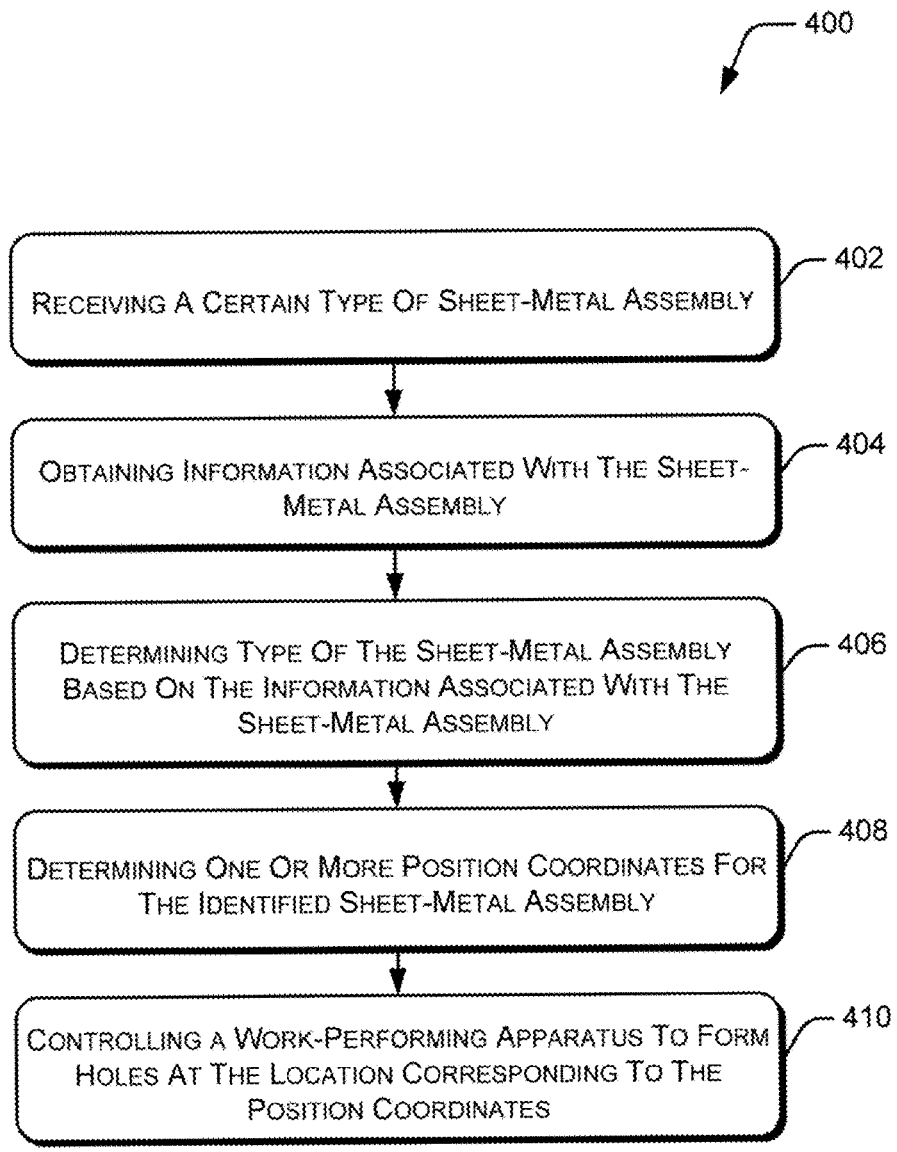
FIG. 4 is a flowchart of a method for implementing a hole forming process onto a sheet-metal assembly, as per an example of the present subject matter.

FIG. 4 illustrates method 400 for forming holes onto a sheet-metal assembly, according to an implementation of the present subject matter. The order in which the method is described is not intended to be construed as a limitation, and any number of the described method blocks may be combined in any order to implement the aforementioned methods, or an alternative method. Furthermore, method 400 may be implemented by processing resource or computing device(s) through any suitable hardware, non-transitory machine readable instructions, or combination thereof.

The method 400 may be performed by programmed computing devices, such as the work control system 102 as depicted in FIGS. 1 and 2. Furthermore, the method 400 may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Although, the method 400 is described below with reference to the work control system 102 as described above, other suitable systems for the execution of these methods can be utilized. Additionally, implementation of these methods is not limited to such examples.

At block 402, a certain type of sheet-metal assembly 106 is received. For example, a sheet-metal assembly 106 may be conveyed through an vehicle manufacturing assembly 100. The sheet-metal assembly 106 may be conveyed through a conveyor line, such as the assembly line path 302 which brings the sheet-metal assembly 106 in close proximity to the work-performing apparatus 104. The sheet-metal assembly 106 may be further placed over, i.e., centrally mounted onto the assembly line path 302.

At block 404, information associated with the sheet-metal assembly is obtained. For example, one or more sensor(s) 108 provided onto the work-performing apparatus 104 may detect attributes representing one or more physical attributes (such as geometry, size, etc.), or based on one or more tagged identifiers associated with the sheet-metal assembly 106. The sensor(s) 108 may, based on the physical attributes or the tagged identifiers, capture certain information associated with the sheet-metal assembly 106. Once the information associated with the sheet-metal assembly 106 is obtained, the same may be communicated to the work control system 102.

At block 406, the type of the sheet-metal assembly is determined based on the information associated with the sheet-metal assembly. For example, the work control system 102 receives the information associated with the sheet-metal assembly 106. The received information may then be analyzed by the assembly detector 110. For example, the assembly detector 110 may compare the information gathered from the sensor(s) 108 with predefined assembly related information. Based on the comparison, the assembly detector 110 may determine the type of the sheet-metal assembly 106, which is to be processed.

At block 408, one or more position coordinates are determined for the identified sheet-metal assembly. For example, upon identifying the type of the sheet-metal assembly 106, the controller 112 may determine one or more position coordinates corresponding to one or more locations on the surface of the sheet-metal assembly 106, at which the forming process is to be carried out.

At block 410, a work-performing apparatus may be controlled to carry out the hole forming process at the location corresponding to the position coordinates. For example, the controller 112 may control the movement and operation of the work-performing apparatus 104. In one implementation, the movement and operation of the work-performing apparatus 104 may be controlled based on one or more executable instructions generated by the controller 112. Based on the instructions, the work-performing apparatus 104 may be maneuvered so as to carry out the hole forming process at locations corresponding to the position coordinates.

Although examples for the present disclosure have been described in language specific to structural features and/or methods, the appended claims are not necessarily limited to the specific features or methods described. Rather, the specific features and methods are disclosed and explained as examples of the present disclosure.

What is claimed is:

1. A system comprising:
a controller configured to:
determine a type of a sheet metal assembly being conveyed in a manufacturing cell based on the width of the sheet metal assembly;
obtain a set of position coordinates based on the type; and
generate instructions for a moveable work-performing apparatus to form holes on the sheet metal assembly at locations corresponding to the set of position coordinates.

2. The system of claim 1, wherein the controller is further configured to obtain the set of position coordinates from a coordinate repository, the set is selected from multiple sets of position coordinates, and each set corresponds to a different type of sheet metal assembly.

3. The system of claim 1, wherein the instructions include instructions for forming holes on the sheet metal assembly by one of cutting and piercing.

4. The system of claim 1, wherein the sheet metal assembly further comprises an axis extending along its length, and the axis is aligned at an angle in a direction in which the sheet metal assembly is conveyed.

5. The system of claim 1, wherein the sheet metal assembly includes a plurality of sheet metal components.

6. A method comprising:
receiving a sheet metal assembly through a conveyor system within a manufacturing cell;
determining a type of the sheet metal assembly based on information associated with the sheet metal assembly and including a width of the sheet metal assembly;
obtaining a set of position coordinates corresponding to one or more points on the sheet metal assembly based on the type; and
forming holes on the sheet metal assembly at the one or more points.

7. The method of claim 6, wherein the determining step includes:
   obtaining attribute data associated with the sheet metal assembly; and
   comparing the attribute data with a mapping repository to determine the type.

8. The method of claim 7, wherein the obtaining attribute data step includes:
   processing a captured image of the sheet metal assembly; and
   scanning one or more unique tagged identifiers associated with the sheet metal assembly.

9. The method of claim 8, wherein each of the one or more unique tagged identifiers includes one of a bar-code and radio-frequency identifier (RFID).

10. The method of claim 6, wherein the operating step includes:
    generating instructions for the moveable work-performing apparatus based on the set of position coordinates;
    executing the generated instruction to position the moveable work-performing apparatus in accordance with the set of the position coordinates; and
    activating the moveable work-performing apparatus for forming holes on the sheet metal assembly at the one or more points on the sheet metal assembly.

11. The method of claim 6, wherein the moveable work-performing apparatus is one of a laser-cutting apparatus and a hydraulically actuated-cutting apparatus.

12. The method of claim 6, further comprising positioning the work-performing apparatus at one of a location adjacent to the conveyor system and above the conveyor system.

13. The method of claim 6, further comprising forming holes on the sheet metal assembly through the moveable work-performing apparatus and another moveable work-performing apparatus, with the moveable-work performing apparatus being positioned on one side of the conveyor system and the other moveable work-performing apparatus being positioned on the other side of the conveyor system.

14. The method of claim 6, wherein the sheet metal assembly includes a plurality of sheet metal components.

15. A vehicle manufacturing assembly comprising:
    an assembly line path extending in a direction and for transporting a sheet metal assembly;
    a moveable work-performing apparatus positioned relative to the assembly line path; and
    a controller coupled to the work-performing apparatus and configured to:
      determine a type for the sheet metal assembly based on the width of the sheet metal assembly;
      obtain a set of position coordinates corresponding to the sheet metal assembly based on the type of the sheet-metal assembly; and
      operating the moveable work-performing apparatus to form holes on the sheet metal assembly at locations corresponding to the set of position coordinates.

16. The vehicle manufacturing assembly of claim 15, wherein the moveable work-performing apparatus is provided at an end of an adjustable arm.

17. The vehicle manufacturing assembly of claim 15, wherein the sheet metal assembly includes a plurality of sheet metal components.

* * * * *